(12) United States Patent
Zanatta et al.

(10) Patent No.: US 12,498,075 B2
(45) Date of Patent: Dec. 16, 2025

(54) COMPOSITE ELBOWS, AGRICULTURAL IMPLEMENTS HAVING COMPOSITE ELBOWS, AND METHODS OF FORMING SUCH ELBOWS

(71) Applicant: AGCO DO BRASIL SA LTDA, Ribeirao Preto (BR)

(72) Inventors: Cassiano Zanatta, Rio Grande Do Sul (BR); Venicius Damo Cunha, Rio Grande Do Sul (BR); Ilsemar Prediger, Rio Grande Do Sul (BR)

(73) Assignee: AGCO do Brasil Soluções Agrícolas Ltda., Jundiaí (BR)

( * ) Notice: Subject to any disclaimer, the term of this patent is extended or adjusted under 35 U.S.C. 154(b) by 327 days.

(21) Appl. No.: 17/817,597

(22) PCT Filed: Jan. 13, 2021

(86) PCT No.: PCT/IB2021/050216
§ 371 (c)(1),
(2) Date: Aug. 4, 2022

(87) PCT Pub. No.: WO2021/161111
PCT Pub. Date: Aug. 19, 2021

(65) Prior Publication Data
US 2023/0341074 A1 Oct. 26, 2023

(30) Foreign Application Priority Data
Feb. 14, 2020 (GB) .................................. 2002033

(51) Int. Cl.
*F16L 57/06* (2006.01)
*A01M 9/00* (2006.01)
*F16L 43/00* (2006.01)

(52) U.S. Cl.
CPC ............ *F16L 57/06* (2013.01); *A01M 9/0084* (2013.01); *F16L 43/001* (2013.01); *F16L 43/008* (2013.01)

(58) Field of Classification Search
CPC ....... F16L 57/06; F16L 43/002; F16L 43/003; A01M 9/0084
See application file for complete search history.

(56) References Cited

U.S. PATENT DOCUMENTS

| | | | | |
|---|---|---|---|---|
| 898,882 | A | * | 9/1908 | Hawkins ................ F16L 57/06 285/179 |
| 2,357,755 | A | * | 9/1944 | Moll ........................ H02G 3/06 285/330 |

(Continued)

FOREIGN PATENT DOCUMENTS

| | | |
|---|---|---|
| CN | 204453830 U | 7/2015 |
| CN | 207687555 U | 9/2018 |

(Continued)

OTHER PUBLICATIONS

EPO Patent Translate of the Description portion of DE-827624, Retrieved on: May 29, 2024, Retrieved from URL: translate (epo.org).*

(Continued)

*Primary Examiner* — Zachary T Dragicevich
*Assistant Examiner* — James A Linford

(57) ABSTRACT

An agricultural implement (10) includes a frame supported by a plurality of wheels and carrying a toolbar (22) and at least one central hopper (20), a plurality of material applicators (204) carried by the toolbar (22), and a plurality of flow lines (26) fluidly connecting the at least one central hopper (20) to the material applicators (204). Each flow line (26) includes at least one composite elbow (210), and each composite elbow (210) has a polymeric body (302) and a wear-resistant plate (314) within the polymeric body (302).

(Continued)

The outlet of the polymeric body (302) has an orientation different from the inlet (304) thereof, and the wear-resistant plate (314) is oriented to deflect material traveling along a central longitudinal axis (A1) of the inlet (304) toward a direction of a central longitudinal axis (A2) of the outlet (306). A method of forming a composite elbow (210) includes disposing a wear-resistant plate (314) within a polymeric body (302) as disclosed.

19 Claims, 4 Drawing Sheets

(56) References Cited

U.S. PATENT DOCUMENTS

| | | | |
|---|---|---|---|
| 4,073,514 A * | 2/1978 | Pate | F16L 37/091 |
| | | | 285/423 |
| 4,461,498 A | 7/1984 | Kunsman | |
| 4,595,319 A * | 6/1986 | Cook | F16L 57/06 |
| | | | 285/179 |
| 4,633,913 A | 1/1987 | Carty et al. | |
| 4,733,889 A | 3/1988 | Haines | |
| 6,637,777 B2 * | 10/2003 | Zimmerman | H02G 3/0675 |
| | | | 285/305 |
| 10,506,756 B2 | 12/2019 | Fanshier et al. | |
| 2018/0077849 A1 | 3/2018 | Fanshier et al. | |
| 2020/0008339 A1 | 1/2020 | Fanshier et al. | |

FOREIGN PATENT DOCUMENTS

| | | | | |
|---|---|---|---|---|
| CN | 207830806 U | | 9/2018 | |
| DE | 827624 C | * | 1/1952 | |
| DE | 1127800 B | * | 4/1962 | |
| DE | 3501264 C1 | | 8/1985 | |
| DE | 10360839 B3 | | 6/2005 | |
| DE | 202011104095 U1 | * | 11/2011 | ........... B65G 53/523 |
| EP | 0277288 A1 | | 8/1988 | |
| EP | 2 874 791 B1 | | 12/2018 | |
| GB | 885543 A | * | 12/1961 | |

OTHER PUBLICATIONS

UK Intellectual Property Office, Search report for related UK Application No. GB2002033.5, dated Aug. 13, 2020.

European Patent Office, International Search Report related to International Patent Application No. PCT/IB2021/050216 , mail date Apr. 23, 2021.

Instituto Nacional De La Propiedad Industrial, Search report related to AR Application No. 20210100322, dated Apr. 25, 2024, 12 pages including translation.

* cited by examiner

COMPOSITE ELBOWS, AGRICULTURAL IMPLEMENTS HAVING COMPOSITE ELBOWS, AND METHODS OF FORMING SUCH ELBOWS

CROSS-REFERENCE TO RELATED APPLICATIONS

This application is a national phase entry under 35 U.S.C. § 371 of International Patent Application PCT/IB2021/050216, filed Jan. 13, 2021, designating the United States of America and published in English as International Patent Publication WO 2021/161111 A1 on Aug. 19, 2021, which claims the benefit of the filing date of U. K. Patent Application 2002033.5, "Composite Elbows, Agricultural Implements having Composite Elbows, and Methods of Forming Such Elbows," filed Feb. 14, 2020, the entire disclosure of which is incorporated herein by reference.

FIELD

Embodiments of the present disclosure relate to agricultural equipment. More particularly, embodiments of the present invention relate to planters or other row-crop equipment for delivering fertilizer and other materials to a field.

BACKGROUND

Agricultural machines such as planters with a plurality of row units are used to plant seeds upon or in the ground. Planters may have a central portion pulled by a tractor, and may have wings extending from either side. The individual row units, mounted to center section or to a wing, typically deliver seeds into separate rows. The row units may receive seed from a common central hopper, which may be used to limit the effect of excessive weight on the wings. That is, the center section may be supported by more wheels or larger wheels, and thus may be better able to support the weight of the filled central hopper without exerting excessive pressure on the ground. To increase efficiency, planters are becoming wider and the seed hoppers that feed the row units are becoming larger.

Planters may also apply fertilizer material near seeds so that germinating seeds have access to selected levels of nutrients. The fertilizer material may be liquid or solid, and may likewise be carried in a bulk central hopper. Dedicated fertilizer applicators may also deliver material from a central hopper to wings.

Solid materials pose particular challenges. In particular, solid materials transported at high speed may be physically abrasive and chemically corrosive because particles may impact surfaces in the material transport system, and may react with certain materials. Flow lines for solid fertilizer materials may be made of plastic (e.g., polypropylene), for its chemical inertness and low cost, or from metals (e.g., steel) for its physical wear-resistance. It would be beneficial to have improved methods of transferring material from central hoppers to wings of agricultural machines while maintaining planter and applicator functionality and reliability.

BRIEF SUMMARY

In some embodiments, an agricultural implement includes a frame supported by a plurality of wheels and carrying a toolbar and at least one central hopper, a plurality of material applicators carried by the toolbar, and a plurality of flow lines fluidly connecting the at least one central hopper to the material applicators. Each flow line includes at least one composite elbow, and each composite elbow has a polymeric body and a wear-resistant plate within the polymeric body. An outlet of the polymeric body has an orientation different from an inlet thereof, and the wear-resistant plate is oriented to deflect material traveling along a central longitudinal axis of the inlet toward a direction of a central longitudinal axis of the outlet.

A composite elbow includes a polymeric body defining an inlet and an outlet, and a wear-resistant plate within the polymeric body. The outlet has an orientation different from the inlet, and the wear-resistant plate is oriented to deflect material traveling along a central longitudinal axis of the inlet toward a direction of a central longitudinal axis of the outlet.

In certain embodiments, a method of forming a composite elbow includes disposing a wear-resistant plate within a polymeric body defining an inlet and an outlet. The outlet has an orientation different from the inlet, and the wear-resistant plate is oriented to deflect material traveling along a central longitudinal axis of the inlet toward a direction of a central longitudinal axis of the outlet.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments when read in conjunction with the accompanying drawings, in which:

DETAILED DESCRIPTION

Figure 1:
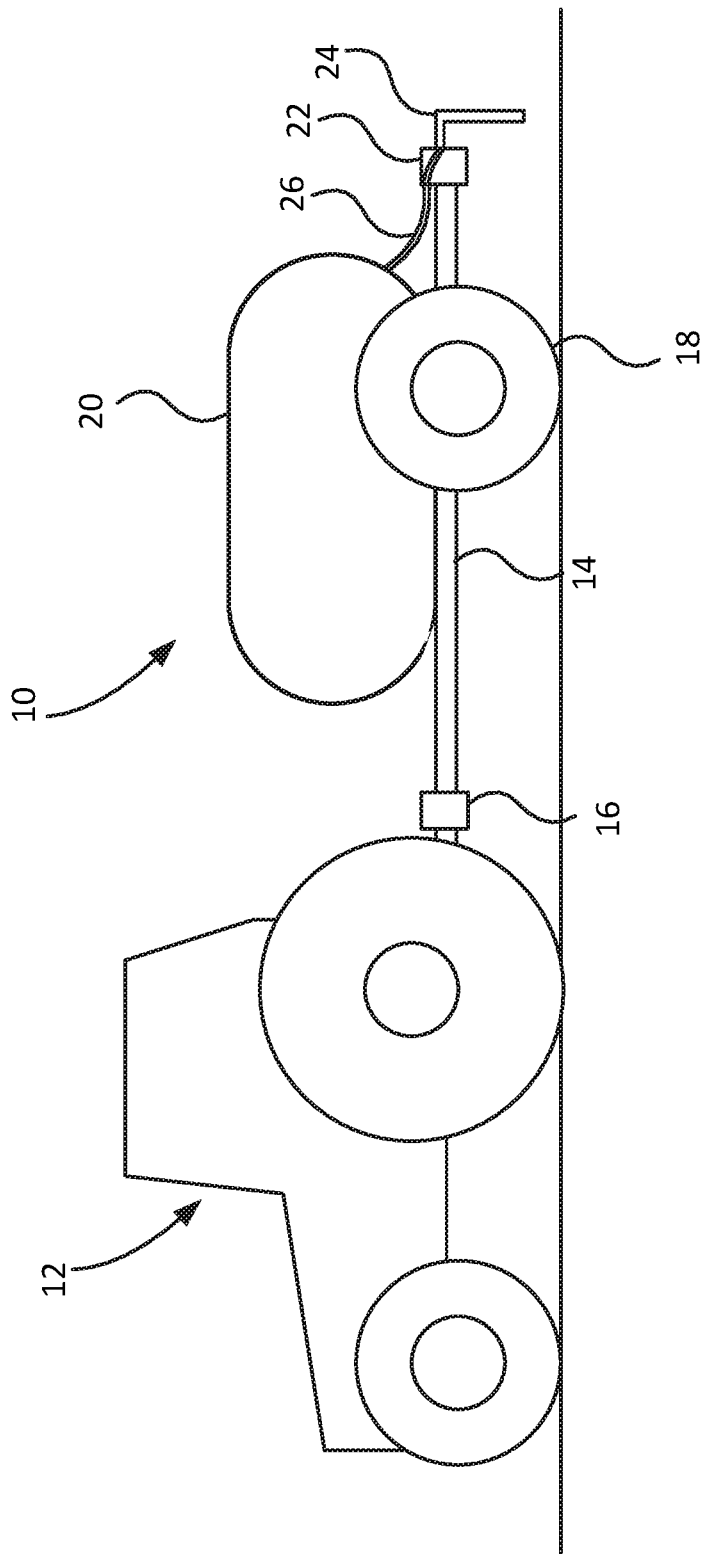
FIG. 1 is a simplified side elevation view of a tractor pulling an agricultural implement.

All references cited herein are incorporated herein in their entireties. If there is a conflict between definitions herein and in an incorporated reference, the definition herein shall control.

The illustrations presented herein are not actual views of any agricultural implement or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates an agricultural implement 10, which may include a wheeled cart having a frame 14 and a tongue hitch 16 for attachment to a tractor 12 or other towing means. In the illustrated embodiment, the agricultural implement 10 is a fertilizer applicator for applying nutrients to row crops. The frame 14 is supported for movement over the ground on wheels 18. The tongue hitch 16 is oriented along a longitudinal axis that is generally in-line with the direction of travel of the tractor 12. The agricultural implement 10 may carry a central hopper 20 configured to transport material to be applied to an agricultural field. The agricultural implement 10 may further include a toolbar 22 to which is mounted a delivery mechanism 24 to distribute the material from the central hopper 20 to the field. The delivery mechanism 24 may include nozzles or other applicators fluidly connected to the central hopper 20 (and optionally to one or more additional hoppers) by flow lines 26. A pressurized air source may drive material through the flow lines 26.

Figure 2:
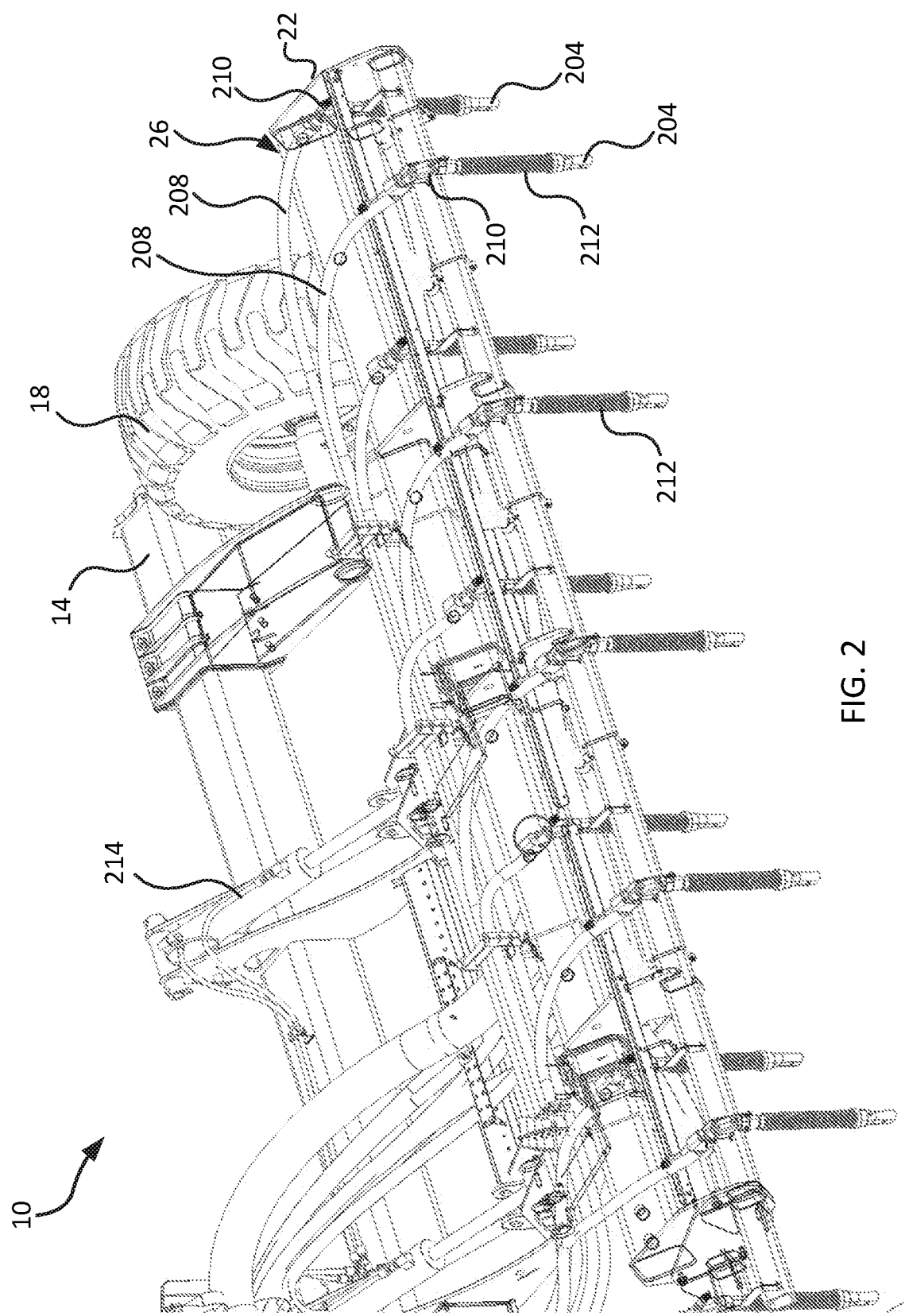
FIG. 2 is a simplified perspective view of a portion of an agricultural implement, such as that depicted in FIG. 1.

FIG. 2 is a view of a portion of an agricultural implement 10, which is depicted in simplified form in FIG. 1. As shown in FIG. 2, the implement 10 includes a toolbar 22 that carries the delivery mechanism 24 (FIG. 1) in the form of a plurality of material applicators 204. Each material applicator 204 is connected to central hopper 20 (FIG. 1) by flow lines 26. The flow lines 26 may include flexible tubing 208, elbows 210, and rigid extensions 212. The material applicators 204 may be attached to the rigid extensions 212 to keep the material applicators 204 a known distance from the toolbar 22, such that the implement 10 can control the location of the material applicators 204 in the field. The flexible tubing 208 may change position as the toolbar 22 moves with respect to the frame 14 of the implement 10 (such as by adjusting one or more actuators 214). The flexible tubing 208 may have gradual bends to route material from the central hopper 20. In particular, solid granular material may tend to flow more consistently (typically driven by air flow) through gradual bends than through sharp turns. The elbows 210 may change the direction of the material abruptly, typically by 90°. The elbows 210 may be configured to be resistant to excessive wear and corrosion from the material being delivered from the central hopper 20 to the material applicators 204.

Figure 3:
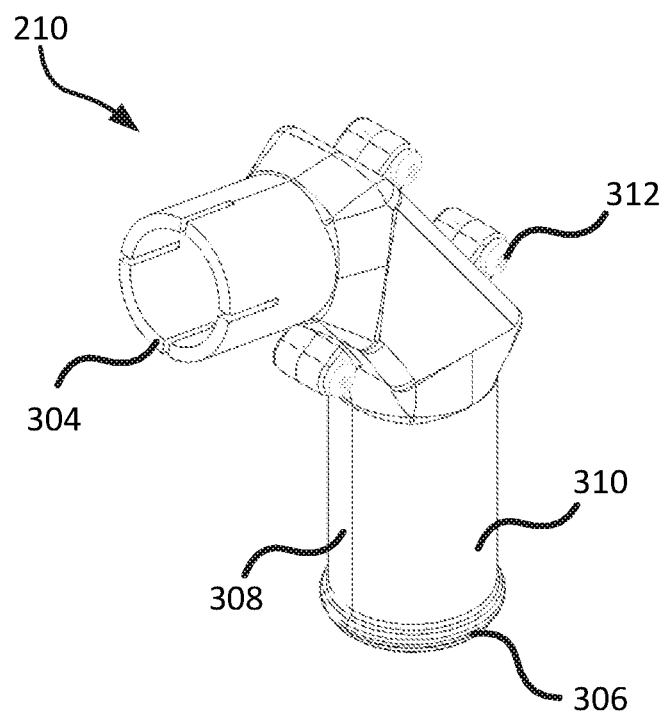
FIG. 3 is a simplified perspective view an elbow that may be used in the implement shown in FIG. 2.
Figure 4:
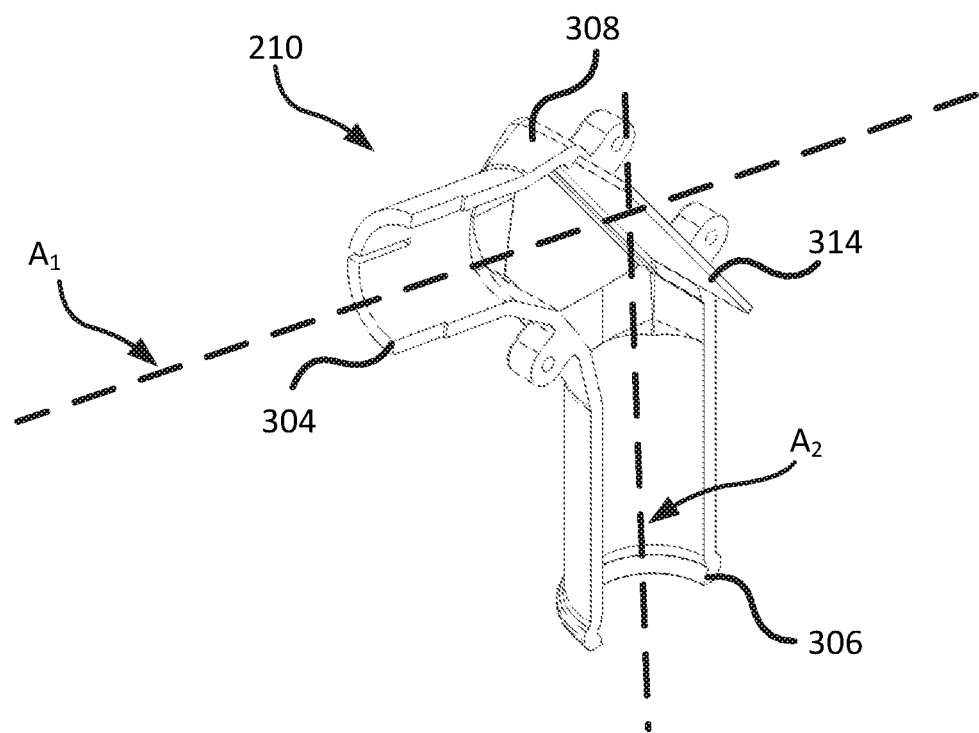
FIG. 4 is a simplified cutaway view of the elbow shown in FIG. 3.

FIG. 3 is a simplified view of one of the elbows 210. FIG. 4 is a simplified cutaway view of one of the elbows 210. The elbow 210 shown has a body 302 defining an inlet 304 and an outlet 306, and the inlet 304 has an orientation different than the outlet 306 (e.g., by 90°, 120°, 135°, etc.). The body 302 may typically include a polymeric material, such as polyethylene, polypropylene, nylon, Teflon, polyvinyl chloride, etc. In other embodiments, the body 302 may include other materials, which may be selected based on desired costs, weight, and/or physical or chemical resistance. The body 302 may be in the form of two portions 308, 310 that fit together to form the body 302. For example, the portions 308, 310 may be secured by screws 312, clips, retaining tabs, an adhesive, or other appropriate means. The portions 308, 310 may be entirely separate parts, as shown, or may be connected during manufacturing by a continuous section of relatively thin material that enables the portions 308, 310 to fold together (which may be referred to in the art as a living hinge). The body 302 may be formed by injection molding, machining, additive manufacturing (i.e., 3-D printing) or another selected method.

The body 302 may contain a wear-resistant plate 314, which may be oriented to deflect material traveling along a central longitudinal axis $A_1$ of the inlet 304 of the body 302 toward a direction of a central longitudinal axis $A_2$ of the outlet 306. The plate 314 may typically be a substantially planar material, but may alternatively have a curvature to assist in directing material in the elbow 210. The plate 314 may be formulated to have a relatively higher hardness and wear-resistance than the body 302 of the elbow 210. For example, the plate 314 may be formed of a stainless steel material (i.e., an alloy having iron, at least 10.5% chromium and a maximum of 1.2% carbon, by weight), a CrMo or CrMoV alloy (i.e., an alloy having at least chromium, molybdenum, and optionally vanadium, in addition to other elements), a ceramic, or any material having a selected hardness. For example, the plate 314 may include a material having a hardness of at least 10 on the Rockwell B scale, at least 20 on the Rockwell B scale, or even at least 50 on the Rockwell B scale. In some embodiments, the plate 314 may include a coating of a wear-resistant material over a substrate (e.g., a ceramic coating on a steel plate).

Though the agricultural implement 10 is depicted as a fertilizer application implement, the material applicators 204 and associated flow lines 26 (including the elbows 210) may be used on a planter or another implement. Thus, the material delivery systems may be used to precisely provide nutrients near seeds such that the nutrients are available for use by the germinating seeds. The agricultural implement 10 may include a center section and a pair of wing sections configured to be raised for on-road transport of the agricultural implement 10 and lowered for field operations. For example, implements having folding wing sections are described in U.S. Patent Application Publication 2020/0008339, "In-Line Tandem Axle Assembly," published Jan. 9, 2020; U.S. Pat. No. 10,506,756, "Rotating Toolbar with Double Rod Cylinder," issued Dec. 19, 2019; and U.S. Patent Application Publication 2018/0077849, "Implement Load Balancing System," published Mar. 22, 2018.

Figure 5:
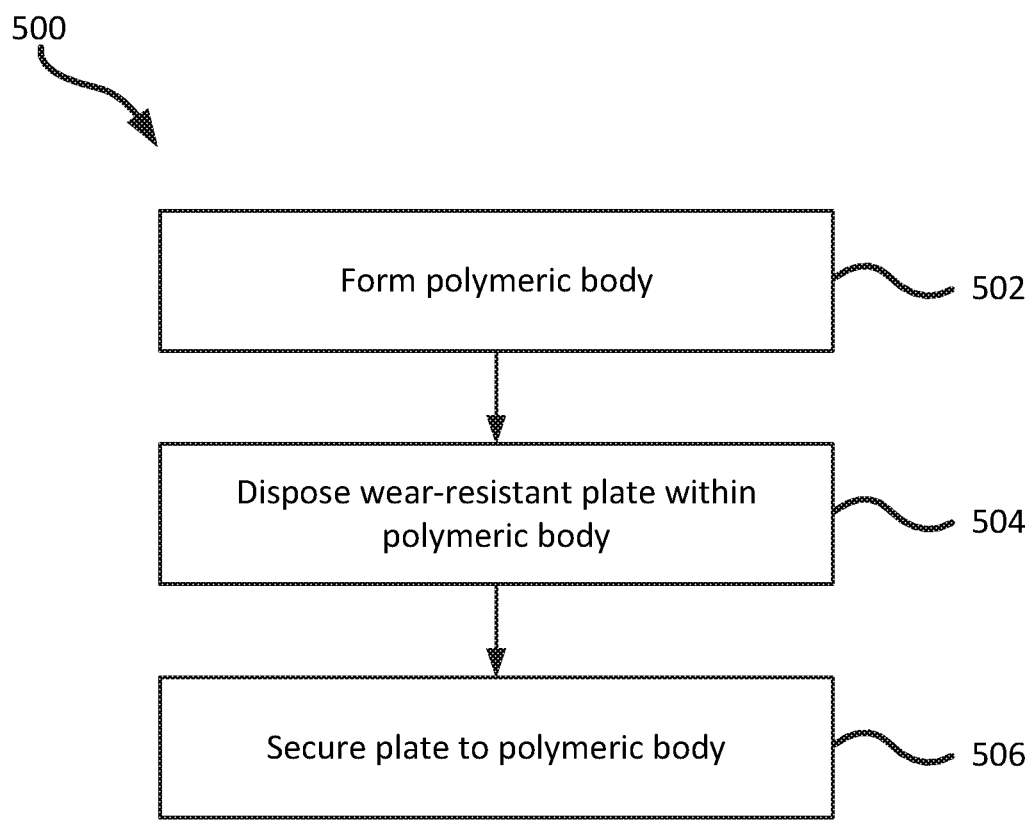
FIG. 5 is a simplified flow chart illustrating a method of forming a composite elbow.

FIG. 5 is a simplified flow chart illustrating a method 500 of forming a composite elbow, such as the elbows 210 shown in FIGS. 2-4. In block 502, a polymeric body is formed, such as by injection molding. The body may be formed in at least two portions, which may be physically connected or physically separate. The polymeric body defines an inlet and outlet having different orientations.

In block 504, a wear-resistant plate is disposed within the polymeric body. The wear-resistant plate is oriented to deflect material traveling along a central longitudinal axis of the inlet toward a direction of a central longitudinal axis of the outlet. If the body is formed in two portions, the wear-resistant plate may be inserted after the body is formed. In other embodiments, the body may be formed around the wear-resistant plate (e.g., by an injection molding process).

In block 506, the wear-resistant plate is secured to the polymeric body. If the polymeric body is formed around the wear-resistant plate, this block 506 may occur concurrently with blocks 502 and 504 as part of a single operation. In embodiments in which the polymeric body includes two or more portions that together secure the wear-resistant plate, the portions may be secured together by screws, clips, retaining tabs, an adhesive, or other appropriate means. The wear-resistant plate may be permanently attached to the polymeric body, or may be reversibly attached (i.e., able to be detached without destroying the polymeric body, such as by removing screws holding the polymeric body together).

The elbows 210 shown in FIGS. 3-4 and described above may have certain benefits in comparison with conventional elbows. For example, the elbows 210 may have a high wear-resistance in the areas most likely to wear—the corner where flow changes direction—a benefit shared with elbows made of certain metals, such as stainless steel. However, stainless steel may be relatively expensive, difficult to machine, and heavy. Other metals (e.g., mild steel) may be cheaper and easier to machine, but may be more susceptible to corrosion. The body 302 may be relatively inexpensive, easy to produce, lightweight, and resistant to corrosion—common benefits of elbows made entirely of polymers. However, polymers typically have poor wear-resistance, especially with regard to abrasion from solid particles traveling through the elbows. Thus, the wear-resistant plate 314 in combination with the body 302 may have a combination of benefits not available using conventional elbows. The elbows 210 may be designed to last substantially as long as the expected lifetime of the implement 10, such that the operator need not periodically replace the elbows 210 as routine maintenance. Thus, the elbows 210 may decrease maintenance costs and increase customer satisfaction with the quality and reliability of the implement 10.

Additional non-limiting example embodiments of the disclosure are described below.

Embodiment 1: An agricultural implement, comprising a frame supported by a plurality of wheels and carrying a toolbar and at least one central hopper, a plurality of material applicators carried by the toolbar, and a plurality of flow lines fluidly connecting the at least one central hopper to the material applicators. Each flow line comprises at least one composite elbow. Each composite elbow comprises a polymeric body defining an inlet and an outlet, the outlet having an orientation different from the inlet, and a wear-resistant plate within the polymeric body and oriented to deflect material traveling along a central longitudinal axis of the inlet toward a direction of a central longitudinal axis of the outlet.

Embodiment 2: The implement of Embodiment 1, wherein the wear-resistant plate comprises stainless steel.

Embodiment 3: The implement of Embodiment 1 or Embodiment 2, wherein the wear-resistant plate comprises a material having a hardness of at least 20 on the Rockwell B scale.

Embodiment 4: The implement of any one of Embodiment 1 through Embodiment 3, wherein the wear-resistant plate is substantially planar.

Embodiment 5: The implement of any one of Embodiment 1 through Embodiment 4, wherein the polymeric body comprises a first portion, and a second portion secured to the first portion such that the first and second portions retain the wear-resistant plate.

Embodiment 6: The implement of Embodiment 5, wherein the second portion is secured to the first portion by at least one screw.

Embodiment 7: The implement of Embodiment 5, wherein the second portion is secured to the first portion by at least one retaining tab.

Embodiment 8: The implement of any one of Embodiment 1 through Embodiment 7, wherein the central longitudinal axis of the outlet is oriented at an angle of approximately 90° with respect to the central longitudinal axis of the inlet.

Embodiment 9: A composite elbow comprising a polymeric body defining an inlet and an outlet, the outlet having an orientation different from the inlet, and a wear-resistant plate within the polymeric body and oriented to deflect material traveling along a central longitudinal axis of the inlet toward a direction of a central longitudinal axis of the outlet.

Embodiment 10: The composite elbow of Embodiment 9, wherein the wear-resistant plate comprises stainless steel.

Embodiment 11: The composite elbow of Embodiment 9 or Embodiment 10, wherein the wear-resistant plate comprises a material having a hardness of at least 20 on the Rockwell B scale.

Embodiment 12: The composite elbow of any one of Embodiment 9 through Embodiment 11, wherein the wear-resistant plate is substantially planar.

Embodiment 13: The composite elbow of any one of Embodiment 9 through Embodiment 12, wherein the polymeric body comprises a first portion, and a second portion secured to the first portion such that the first and second portions retain the wear-resistant plate.

Embodiment 14: The composite elbow of Embodiment 13, wherein the second portion is secured to the first portion by at least one screw.

Embodiment 15: The composite elbow of Embodiment 13, wherein the second portion is secured to the first portion by at least one retaining tab.

Embodiment 16: The composite elbow of any one of Embodiment 9 through Embodiment 15, wherein the central longitudinal axis of the outlet is oriented at an angle of approximately 90° with respect to the central longitudinal axis of the inlet.

Embodiment 17: A method of forming a composite elbow, the method comprising disposing a wear-resistant plate within a polymeric body defining an inlet and an outlet, the outlet having an orientation different from the inlet, wherein the wear-resistant plate is oriented to deflect material traveling along a central longitudinal axis of the inlet toward a direction of a central longitudinal axis of the outlet.

Embodiment 18: The method of Embodiment 17, wherein disposing the wear-resistant plate within the polymeric body comprises connecting two portions of the polymeric body around the wear-resistant plate.

Embodiment 19: The method of Embodiment 18, further comprising securing the two portions of the polymeric body to one another.

Embodiment 20: The method of Embodiment 19, wherein securing the two portions of the polymeric body to one another comprises securing the two portions with at least one screw.

Embodiment 21: The method of Embodiment 19, wherein securing the two portions of the polymeric body to one another comprises securing the two portions with at least one retaining tab.

Embodiment 22: The method of Embodiment 19, wherein securing the two portions of the polymeric body to one another comprises permanently securing the two portions together.

Embodiment 23: The method of any one of Embodiment 17 through Embodiment 15, further comprising forming the polymeric body by injection molding.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various implement types and configurations.

What is claimed is:

1. A composite elbow, comprising:
a polymeric body defining an inlet aligned along a central longitudinal inlet axis and an outlet aligned along a central longitudinal outlet axis, the central longitudinal outlet axis having an orientation different from the central longitudinal inlet axis; and
a substantially planar wear-resistant plate within the polymeric body and having a major surface with a normal vector oriented at an acute angle relative to the central longitudinal inlet axis and the central longitudinal outlet axis, wherein the wear-resistant plate defines a portion of an exterior surface of the composite elbow when the composite elbow is fully assembled.

2. The composite elbow of claim 1, wherein the wear-resistant plate comprises stainless steel.

3. The composite elbow of claim 1, wherein the wear-resistant plate comprises a material having a hardness of at least 20 on the Rockwell B scale.

4. The composite elbow of claim 1, wherein the polymeric body comprises:
a first portion; and
a second portion secured to the first portion such that the first and second portions retain the wear-resistant plate.

5. The composite elbow of claim 4, wherein the second portion is secured to the first portion by at least one screw.

6. The composite elbow of claim 4, wherein the second portion is secured to the first portion by at least one retaining tab.

7. The composite elbow of claim 1, wherein the central longitudinal outlet axis is oriented at an angle of approximately 90° with respect to the central longitudinal inlet axis.

8. The composite elbow of claim 1, wherein the wear-resistant plate comprises a coating of a wear-resistant material over a substrate.

9. The composite elbow of claim 8, wherein the wear-resistant plate comprises a ceramic coating on a steel plate.

10. An agricultural implement, comprising:
a frame supported by a plurality of wheels and carrying a toolbar and at least one central hopper;
a plurality of material applicators carried by the toolbar; and
a plurality of flow lines fluidly connecting the at least one central hopper to the material applicators, wherein each flow line comprises at least one composite elbow, each composite elbow comprising:
a polymeric body defining an inlet aligned along a central longitudinal inlet axis and an outlet aligned along a central longitudinal outlet axis, the central longitudinal outlet axis having an orientation different from the central longitudinal inlet axis; and
a substantially planar wear-resistant plate within the polymeric body and having a major surface with a normal vector oriented at an acute angle relative to the central longitudinal inlet axis and the central longitudinal outlet axis, wherein the wear-resistant plate defines a portion of an exterior surface of the composite elbow when the composite elbow is fully assembled.

11. The agricultural implement of claim 10, wherein the wear-resistant plate comprises stainless steel.

12. The agricultural implement of claim 10, wherein the wear-resistant plate comprises a material having a hardness of at least 20 on the Rockwell B scale.

13. The agricultural implement of claim 10, wherein the polymeric body comprises:
a first portion; and
a second portion secured to the first portion such that the first and second portions retain the wear-resistant plate.

14. The agricultural implement of claim 10, wherein the central longitudinal axis of the outlet is oriented at an angle of approximately 90° with respect to the central longitudinal axis of the inlet.

15. A composite elbow, consisting essentially of:
a polymeric body comprising a first half and a second half, the first and second halves together defining an inlet and an outlet, the outlet having an orientation different from the inlet;

a fastening means configured to secure the first half to the second half, the fastening means selected from the group consisting of screws, clips, retaining tabs, and an adhesive; and a substantially planar wear-resistant plate secured to the first and second halves of the polymeric body when the first and second halves are secured by the fastening means, wherein the wear-resistant plate has a major surface with a normal vector oriented at an acute angle relative to a central longitudinal axis of the inlet and a central longitudinal axis of the outlet.

16. The composite elbow of claim 15, wherein the wear-resistant plate comprises stainless steel.

17. The composite elbow of claim 15, wherein the wear-resistant plate comprises a material having a hardness of at least 20 on the Rockwell B scale.

18. The composite elbow of claim 15, wherein the central longitudinal axis of the outlet is oriented at an angle of approximately 90° with respect to the central longitudinal axis of the inlet.

19. The composite elbow of claim 15, wherein the wear-resistant plate is fixed relative to the polymeric body.

* * * * *